(12) United States Patent
Ullanoormadam

(10) Patent No.: US 6,808,737 B2
(45) Date of Patent: Oct. 26, 2004

(54) TRANS FREE HARD STRUCTURAL FAT FOR MARGARINE BLEND AND SPREADS

(75) Inventor: Sahasranamam Ramasubramaniam Ullanoormadam, Johor (MY)

(73) Assignee: Premium Vegetable Oils Berhad (MY)

( * ) Notice: Subject to any disclaimer, the term of this patent is extended or adjusted under 35 U.S.C. 154(b) by 0 days.

(21) Appl. No.: 09/766,158

(22) Filed: Jan. 19, 2001

(65) Prior Publication Data

US 2002/0001662 A1 Jan. 3, 2002

(51) Int. Cl.⁷ .................................................. A23D 7/00
(52) U.S. Cl. ...................................... 426/603; 426/607
(58) Field of Search .............................. 426/603, 607, 426/601, 602, 608, 604; 554/10, 15, 17, 23, 29, 30

(56) References Cited

U.S. PATENT DOCUMENTS

| | | | | |
|---|---|---|---|---|
| 4,055,679 A | * | 10/1977 | Kattenberg et al. | 426/607 |
| 4,410,557 A | * | 10/1983 | Miller | 426/607 |
| 5,231,200 A | * | 7/1993 | Kuwabara et al. | 554/191 |
| 5,547,698 A | * | 8/1996 | Lansbergen et al. | 426/601 |
| 5,667,837 A | * | 9/1997 | Broomhead et al. | 426/601 |
| 5,849,940 A | * | 12/1998 | Harris et al. | 554/206 |
| 5,858,445 A | * | 1/1999 | Huizinga et al. | 426/607 |
| 5,879,735 A | * | 3/1999 | Cain et al. | 426/603 |
| 5,888,575 A | * | 3/1999 | Lansbergen et al. | 426/607 |
| 6,156,370 A | * | 12/2000 | Huizinga et al. | 426/607 |
| 6,238,723 B1 | * | 5/2001 | Sassen et al. | 426/607 |

OTHER PUBLICATIONS

List, G. R. et al. 1995. Preparation and Properties of Zero Trans Soybean Oil Margarines. JAOCS 72:383.*
List, G. R. et al. 1995. Margarine and Shortening Oils by Interesterification of Liquid and Trisaturated Triglycerides. JAOCS 72:379.*
List, G. R. et al. 1977. "Zero trans" Margarines: Preparation, Structure, and Properties of Interesterified Soybean Oil–Soy Trisaturate Blends. JAOCS 54:408.*
List, G. R. et.al 1997. Effect of Interesterification on the Structure and Physical Properties of High–Stearic Acid Soybean Oils. JAOCS 74: 327.*
Ray, S. et al. 1996. Comparative Nutritional Quality of Palmstearin–Liquid Oil Blends and Hydrogenated Fat (vanaspati). JAOCS 74:617.*
Ghosh, S. et al. 1997. Utilization of High–Melting Palm Stearin in Lipase–Catalyzed Interesterification with Liquid Oils. JAOCS 74:589.*
Aini, I. et al. 1999. Trans–Free Vanaspati Contaiing Ternary Blends of Palm Oil–Palm Stearin–Palm Olein and Palm Oil–Palm Stearin–Palm Kernel Olein. JAOCS 76: 643.*
Petrauskaite. V. et al. 1998. Physical and Chemical Properties of trans–Free Fats Produced by Chemical Interesterification of Vegetable Oil Blends. JAOCS 75:489.*
Kok, L. et al. 1999. Trans–Free Margarine from Highly Saturated Soybean Oil. JAOCS 76:1175.*
Heckers, H. 1978. Trans–isomeric fatty acids present in West German margarines, shortenings, frying and cooking fats. Am. J. of Clinical Nutrition 31:1041.*
D'Souza, V. et al. 1991. Chemical and Physical Properties of the High Melting Glyceride Fractions of Commercial Margarines. JAOCS 68:153.*
Schweitzer III, 1994. Developments in Dry Fractionation of Fats. from Oils and Fats Group symposium Fractonal Crystallisatio of Fats held in London on Mar. 8, 1994, Paper No. 0040.*

* cited by examiner

Primary Examiner—Carolyn Paden
(74) Attorney, Agent, or Firm—Schweitzer Cornman Gross & Bondell LLP

(57) ABSTRACT

A Trans free structural fat suitable as a margarine fat blend for the manufacture of low SAFA (Saturated Fatty Acid) poly/mono unsaturated margarine and spreads and fat blends for margarine/spreads. The structural fat is made from selectively fractionated non-hydrogenated high melting palm oil fraction which is interesterified with dry fractionated non-hydrogenated palm kernel fraction with high yield ratios that can be economically and commercially used as structural fat for the aforesaid manufacture.

26 Claims, No Drawings

TRANS FREE HARD STRUCTURAL FAT FOR MARGARINE BLEND AND SPREADS

BACKGROUND OF THE INVENTION

Historically emulsified fat system in margarine/spreads has been designed to satisfy customer requirements such as significant cooling impact, a rapid sharp melt sensation, and not having a coated or waxy feel on the tongue. In addition, it should impart temperature cycling stability (heat stability) as well as spreadability when taken out frequently from the refrigerator as a prominent feature.

To achieve these objectives, margarine fat blend is being formulated using hard stocks derived by hydrogenation of liquid oils. However, with the adverse effect of Trans fatty acids being published, consumers are looking for margarine/spreads with practically no Trans fatty acids.

BRIEF DESCRIPTION OF THE INVENTION

This can be achieved by using fully hydrogenated fats as structural fat, which usually does not contain Trans fatty acid or very negligible amount. Hydrogenation processes are generally viewed as the main reason for the development of Trans fatty acids in oils and fats. Hence, there is a strong consumer perception against usage of and hydrogenated oil/fat in the food products including margarine/spreads.

The present invention serves to develop margarine/spreads using no hydrogenated oils in their hard stock at the same time serving to reduce the saturated fatty acid levels (hereinafter referred to as SAFA) in the products.

DETAILED DESCRIPTION OF THE INVENTION

The present invention is concerned with a Trans free hard structural fat suitable for the manufacture of low SAFA (Saturated Fatty Acid) poly/mono unsaturated margarine and spreads and fat blends for margarine/spreads using the above mentioned structural fat. This structural fat is made from selectively fractionated non-hydrogenated palm oil fraction, which is interesterified with dry fractionated non-hydrogenated palm kernel fraction to obtain hard structural fat with high yield ratios that can be economically and commercially used as structural fat for the manufacture of Trans free low SAFA, poly unsaturated/mono unsaturated margarine/spreads.

Theoretical Considerations

The hard stock contributes triglycerides especially of the trisaturated type. A certain minimum quantity of these is essential to provide the "structural fat" and to prevent oiling out of the liquid oil. From the patent literature and general experience, this minimum quantity is around 6%. More is acceptable and desirable if the amount of $H_3$ tri-glycerides, and especially tristearin, is not greater than 2% otherwise poor consumer mouth feel will result. Hence content of $H_2M$ triglycerides is valuable, to give the structuring effect. Hence the need for a lauric oil.

When the hard stock components are interesterified, the amounts of trisaturated triglycerides in the interesterified product are determined entirely by the content of saturated fatty acids in the blend. This relationship is very critical as shown by the results:

| % Saturated Fatty Acid in the Oil blend | % Trisaturated Triglycerides After Interesterification |
|---|---|
| 50 | 13 |
| 60 | 22 |
| 70 | 34 |
| 80 | 51 |
| 90 | 73 |

Taking sunflower oil as the PUFA oil to be used in the blend, at a level of 80% (SAFA 10.3%) then the hard stock should not contribute more than 11.76% SAFA to the final blend considering that the SAFA content of polyunsaturated margarine should not exceed 20%. If 20% of the hard stock were used for the margarine blend along with Sunflower oil as above (a high usage level)—and if we also want a minimum of 6% trisaturated Tgs in the final blend, it can be seen from the above table that the SAFA content of the hard stock must be about 67% so that interesterified hard stock has 30% trisaturated triglyceride. Assuming only 15% hard stock is used then the SAFA content of the hard stock must be about 74%, so that, it has 40% trisaturated triglyceride after interesterification. These are minimum requirements and a higher amount of trisaturated Tgs would be desirable.

The usage of hard structural fat in the blend can be 5 to 25% and the liquid oil or its blends can be 95–75%.

By way of summary, a margarine blend and spread consisting of 60–95% of a liquid oil such as sunflower oil, Canola oil, soy oil, peanut oil, rice bran oil, olive oil, safflower oil, corn oil or marine oil or a blend of any of the above liquids is blended with a Trans free hard structural fat at 5–40% level. Said hard structural fat is made from selectively fractionated non-hydrogenated palm oil fraction, which is interesterified with lauric fat such as dry fractionated non-hydrogenated palm kernel fraction without using a hydrogenation process nor using an organic solvent or detergent for fractionation.

The margarine/spread fat blend has a liquid oil blend which preferably has a high poly/mono unsaturated level such that in the total fat blend the poly/mono unsaturation level exceeds 40% to better support health claims (high poly/mono unsaturated, low saturated fatty acid (SAFA) margarine/spreads can be made).

The hard palm fraction has a C16 carbon chain residue greater than 70% preferably greater than 80% and most preferably greater than 84%. The hard palm fraction has a melting point higher than 57 Deg C., preferably greater than 60 Deg C. and can be flaked for easy handling because of its high melting point in spite of not being required to undergo hydrogenation and has a solid fat content of >75% at 40 Deg C. preferably >80% solids at 40 Deg C. The palm fat/palm oil or its stearin fraction is selectively dry fractionated by melt crystallization process to harvest the hard palm fraction with C16 level of >75%, preferably >83% with a total unsaturation level of >15% preferably less than 10%.

The palm fat/oil is dry fractionated using a two-step melt crystallization process, the first step being performed between 20–25 degrees Celsius, preferably between 22–24 degrees Celsius, to obtain a medium had palm fraction. The medium hard palm fraction is then once again dry fractionated between 45–55 degrees Celsius, more preferably 49–52 degrees Celsius (depending of the iodine number of the first dry fraction) to harvest very hard palm fraction rich in C16 fatty acids.

The palm fraction in the second fractionation step is separated in a high pressure membrane type filter wherein a pressure of 10–35 bar (preferably >20 bar, most preferably >30 bar) is used to inflate the membrane so as to remove the liquid fraction occluded in the hard fat, thus eliminating the requirement of solvent fraction method. This does not exclude use of high pressure hydraulic pressing of the cooled slab of palm oil fraction to obtain the same desired hard palm fat suitable for the manufacture of hard structural fat.

The hard structural fat is produced by interesterification reaction of hard palm fraction with hard palm kernel fraction, the resultant hard fat is not further fractionated but used as such as a hard structural fat, thus eliminating further processing a by-product disposal, resulting in a high yield of the structural fat at a low cost.

The hard structural fat is produced by interesterification reaction without having to further undergo fractionation process, thus eliminating the disposal problems of by-product fractions associated with such processing to obtain hard structural fat Preferably, the hard structural fat is produced by interesterification reaction of hard palm fraction with hard palm kernel fraction such a way that the hard structural fat has a trisaturated triglyceride of $H_3$ type of C16 and above is less than 25% preferably less than 20%.

What is claimed is:

1. A margarine and spread fat blend comprising 60–95% of a liquid oil selected from the group consisting of sunflower oil, Canola oil, soy oil, pea nut oil, rice bran oil, olive oil, safflower oil, corn oil and marine oil, or a blend of any of the above liquid oils with a Trans free hard structural fat at 40–5% level whereby the said hard structural fat is made from selectively fractionated non-hydrogenated palm oil fraction, which is interesterified with lauric fat such as dry fractionated non-hydrogenated palm kernel fraction without using hydrogenation process and without using organic solvent or detergent for fractionation.

2. A margarine and spread fat blend according to claim 1, wherein said liquid oil or said blend of liquid oils has high poly/mono unsaturated level such that in the total fat blend the poly/mono unsaturation level exceeds 40%.

3. A margarine and spread fat blend according to claim 1, wherein said trans free hard structural fat is produced without using hydrogenation process so that any Trans fatty acid residue produced during hydrogenation is avoided.

4. A margarine and spread fat blend according to claim 1, wherein said hard palm oil fraction has a C16 carbon chain residue greater than 70%.

5. A margarine and spread fat blend according to claim 1, wherein said hard palm oil fraction has a melting point higher than 57 degrees Celsius and can be flaked for easy handling because of its high melting point in spite of not being required to undergo hydrogenation and has a solid fat content of greater than 75% at 40 degrees Celsius.

6. A margarine and spread fat blend and spread made according to claim 1 wherein the hard structural fat is produced by an interesterification reaction of a hard palm oil fraction with a hard palm kernel oil fraction, the resultant hard fat is not further fractionated but used as such as a trans free hard structural fat.

7. A margarine and spread fat blend according to claim 6, wherein said trans free hard structural fat has a trisaturated triglyceride $H_3$ type less than 25% wherein "H" denotes saturated fatty acid residues with carbon numbers greater than or equal to 16.

8. A margarine and spread fat blend according to claim 1, wherein a hard palm oil fraction having a C-16 level of higher than 75% is subjected to random chemical interesterification with a hard palm kernel oil fraction, and then subjecting the interesterified mixture to a physical fractionation method of panning and pressing at a temperature of less than 30 degrees Celsius to yield minimum 75% level of extra hard structural fat.

9. A margarine and spread fat blend according to claim 1, wherein said hard palm oil fraction is produced by:
   selectively dry fractionating the said palm oil or a stearin fraction thereof, by a melt crystallization process;
   separating said hard palm oil fraction from said dry fractionated palm oil in a high pressure membrane filter, such that said hard palm oil fraction has a C16 carbon chain fatty acid residue level of greater than 70%; and
   said hard palm oil fraction being produced without using solvent or detergent for fractionation.

10. A margarine and spread fat blend according to claim 9, further comprising:
    said hard palm oil fraction is produced using a two-step melt crystallization process;
    a first step of said two-step melt crystallization process comprising of crystallizing said palm oil at a temperature between about 20 and 25 degrees Celsius and filtering a crystallized slurry of said palm oil through a membrane filter, said step producing a medium hard palm oil fraction; and
    a second step of said two-step melt crystallization process comprising crystallizing said medium hard palm oil fraction at a temperature between about 45 to 55 degrees Celsius and filtering a crystallized slurry of said medium hard palm oil fraction through a high pressure membrane filter, said second step producing a very hard palm oil fraction with a C16 carbon chain fatty acid residue level of greater than 70%.

11. A margarine and spread fat blend according to claim 10, further comprising using a pressure of about 10 to 35 bar to inflate membranes of said high pressure membrane filter to remove a liquid fraction occluded in a hard palm oil fraction collected in said high pressure membrane filter.

12. A margarine and spread fat blend according to claim 9, further comprising using a pressure of about 10 to 35 bar to inflate membranes of said high pressure membrane filter to remove a liquid fraction occluded in a hard palm oil fraction collected in said high pressure membrane filter.

13. A margarine and spread fat blend, according to claim 1, wherein:
    said trans free hard structural fat is produced by interesterification of a hard palm oil fraction having a C16 carbon chain fatty acid residue level of greater than 70% with a hard palm kernel oil fraction; and
    said trans free hard structural fat without further fractionation is blended with said liquid oil.

14. A trans free hard structural fat, comprising:
    a hard palm oil fraction consisting of selectively fractionated non-hydrogenated palm oil or a stearin fraction thereof, said hard palm oil having a C16 fatty acid residue level in the hard palm oil fraction is greater than 70%;
    interesterifying said hard palm oil fraction with lauric fat such as dry fractionated non-hydrogenated palm kernel oil fraction without using hydrogenation process and without subjecting the said trans free hard structural fat to further fractionation process;
    said trans free hard structural fat being produced without using organic solvent or detergent for fractionation.

15. A trans free hard structural fat, according to claim 14, further comprising:
said dry fractionating process is a melt crystallization process;
separating a hard palm oil fraction in a high pressure membrane filter, such that said hard palm oil fraction has a C16 carbon chain fatty acid residue level of greater than 70%; and
said hard palm oil fraction being produced without a solvent or detergent in fractionation.

16. A trans free hard structural fat, according to claim 15, further comprising using a pressure of about 10 to 35 bar to inflate a membrane of said high pressure membrane filter to remove a liquid fraction occluded in the hard palm oil fraction collected in said high pressure membrane filter.

17. A trans free hard structural fat, according to claim 14, further comprising:
said hard palm oil fraction is produced using a two-step melt crystallization process;
a first step of said two-step melt crystallization process comprising of crystallizing said palm oil at a temperature between about 20 and 25 degrees Celsius and filtering a crystallized slurry of said palm oil through a membrane filter, said first step producing a medium hard palm oil fraction; and
a second step of said two-step melt crystallization process comprising crystallizing said medium hard palm oil fraction at a temperature between about 45 to 55 degrees Celsius and filtering a crystallized slurry of said medium hard palm oil fraction through a high pressure membrane filter, said second step producing a very hard palm oil fraction with a C16 carbon chain fatty acid residue level of greater than 70%.

18. A trans free hard structural fat, according to claim 17, further comprising using a pressure of about 10 to 35 bar to inflate a membrane of said high pressure membrane filter to remove a liquid fraction occluded in the hard palm oil fraction collected in said high pressure membrane filter.

19. A trans free hard structural fat, according to claim 14, wherein said trans free hard structural fat is produced without using a hydrogenation process so that the trans free fatty acid residue produced during hydrogenation is eliminated.

20. A trans free hard structural fat, according to claim 14, wherein said palm oil fraction has a C16 carbon chain fatty acid residue greater than 70%.

21. A trans free hard structural fat, according to claim 14, wherein the palm oil fraction has a melting point higher than 57 degrees Celsius and can be flaked for easy handling because of its high melting point in spite of not being required to undergo hydrogenation and has a solid fat content of greater than 75% at 40 degrees Celsius.

22. A hard palm oil fraction, comprising:
said hard palm oil fraction having a C16 carbon chain residue level greater than 70%;
said hard palm oil fraction being produced by selectively dry fractionating palm oil or a stearin fraction thereof, by a melt crystallization process;
separating the hard palm oil fraction from a crystallized slurry, in a high pressure membrane filter; and
subjecting the hard palm oil fraction separated in the high pressure membrane filter to a pressure of about 10 to 35 bar by inflating a membrane of said high pressure membrane filter to remove a liquid fraction occluded in the hard palm oil fraction collected in said high pressure membrane filter;
said hard palm oil fraction is produced using a two-step melt crystallization process;
a first step of said two-step melt crystallization process comprising crystallizing said palm oil at a temperature between about 20 and 25 degrees Celsius and filtering a crystallized slurry of said palm oil through a membrane filter, said first step producing a medium hard palm oil fraction; and
a second step of said two-step melt crystallization process comprising crystallizing said medium hard palm oil fraction at a temperature between about 45 to 55 degrees Celsius and filtering a crystallized slurry of said medium hard palm oil fraction through a high pressure membrane filter;
said second step producing a very hard palm oil fraction with a C16 carbon chain fatty acid residue level of greater than 70%.

23. A hard palm oil fraction, according to claim 22, further comprising using a pressure of about 10 to 35 bar to inflate membranes of said high pressure membrane filter to remove a liquid fraction occluded in the hard palm oil fraction separated in said high pressure membrane filter so as to enrich the C16 fatty acid residue in the said hard palm oil fraction.

24. A hard palm oil fraction, comprising:
said hard palm oil fraction having a C16 carbon chain residue level greater than 70%;
said hard palm oil fraction being produced by cooling a palm oil stearin fraction to below 30 degrees Celsius to form a hard slab;
pressing said slab in a high pressure hydraulic press to recover a hard palm oil fraction; and
said hard palm oil fraction has a melting point higher than 57 degrees Celsius and can be flaked for easy handling because of its high melting point in spite of not being required to undergo hydrogenation and ha a solid fat content of greater than 75% at 40 degrees Celsius.

25. A hard palm oil fraction, comprising:
said hard palm oil fraction having a C16 carbon chain residue level greater than 70%;
said hard palm oil fraction being produced by selectively dry fractionating palm oil or a stearin fraction thereof, by a melt crystallization process;
separating the hard palm oil fraction from a crystallized slurry, in a high pressure membrane filter;
subjecting the hard palm oil fraction separated in the high pressure membrane filter to a pressure of about 10 to 35 bar by inflating a membrane of said high pressure membrane filter to remove a liquid fraction occluded in the hard palm oil fraction collected in said high pressure membrane filter; and
said hard palm oil fraction has a melting point higher than 57 degrees Celsius and can be flaked for easy handling because of high melting point in spite of not being required to undergo hydrogenation and has a solid fat content of greater than 75% at 40 degrees Celsius.

26. A hard palm oil fraction, comprising:
said hard palm oil fraction having a C16 carbon chain residue level is greater than 70%;
said hard palm oil fraction being produced by selectively dry fractionating palm oil or a stearin fraction thereof, by a melt crystallization process;
said hard palm oil fraction is produced using a two-step melt crystallization process;

a first step of said two-step melt crystallization process comprising crystallizing said palm oil at a temperature between about 20 and 25 degrees Celsius and filtering a crystallized slurry of said palm oil through a membrane filter, said first step producing a medium hard palm oil fraction; and a second step of said two-step melt crystallization process comprising crystallizing said medium had palm oil fraction at a temperature between about 45 to 55 degrees Celsius and filtering a crystallized slurry of said medium hard palm oil fraction through a high pressure membrane filter;

said second step producing a very hard palm oil fraction with a C16 carbon chain fatty acid residue level of greater than 70%.

* * * * *